United States Patent
Jung et al.

(10) Patent No.: US 11,385,811 B2
(45) Date of Patent: Jul. 12, 2022

(54) STORAGE DEVICE AND METHOD OF OPERATING THE SAME

(71) Applicant: Samsung Electronics Co., Ltd., Suwon-si (KR)

(72) Inventors: Kibeen Jung, Incheon (KR); Minkyu Kim, Cheongju-si (KR); Jungmin Seo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/035,257

(22) Filed: Sep. 28, 2020

(65) Prior Publication Data

US 2021/0247916 A1    Aug. 12, 2021

(30) Foreign Application Priority Data

Feb. 10, 2020    (KR) .................. 10-2020-0015838

(51) Int. Cl.
*G06F 3/06*    (2006.01)

(52) U.S. Cl.
CPC .......... *G06F 3/0625* (2013.01); *G06F 3/0634* (2013.01); *G06F 3/0679* (2013.01)

(58) Field of Classification Search
CPC ..... G06F 3/0625; G06F 3/0634; G06F 3/0679
See application file for complete search history.

(56) References Cited

U.S. PATENT DOCUMENTS

| | | | |
|---|---|---|---|
| 9,244,682 B2 | 1/2016 | Rowles et al. | |
| 9,411,405 B2 | 8/2016 | Grimsrud et al. | |
| 9,442,668 B1 * | 9/2016 | Adams | G06F 3/0625 |
| 10,275,008 B2 | 4/2019 | Jones et al. | |
| 2014/0181553 A1 | 6/2014 | Eckert et al. | |
| 2015/0049552 A1 * | 2/2015 | Park | G06F 3/0634 365/185.18 |
| 2015/0286271 A1 | 10/2015 | Vrind et al. | |
| 2016/0266638 A1 | 9/2016 | Anazawa et al. | |
| 2017/0168853 A1 | 6/2017 | Nampoothiri et al. | |

(Continued)

OTHER PUBLICATIONS

Benini L et al, "A Survey of Design Techniques for System-Level Dynamic Power Management", IEEE Transactions On Very Large Scale Integration (VLSI) Systems, Jun. 1, 2000, p. 299, vol. 8, No. 3, Piscataway, NJ, USA (18 pages).

(Continued)

*Primary Examiner* — Edward J Dudek, Jr.
(74) *Attorney, Agent, or Firm* — Muir Patent Law, PLLC

(57) ABSTRACT

A storage device is provided. In relation to the storage device operating in an active mode and a low power mode, the storage devices includes a nonvolatile memory including a plurality of nonvolatile memory cells, and a storage controller configured to process commands inputted from a host device in the active mode, wherein the storage controller includes a power mode manager that adjusts the plurality of power modes, wherein, when a first command is inputted, the power mode manager predicts an input prediction time for a second command to be inputted from the host device after the first command, changes from the active mode to the low power mode when a processing operation of the first command is completed, and returns to the active mode from the low power mode when a set return time elapses according to the input prediction time.

19 Claims, 14 Drawing Sheets

(56) References Cited

U.S. PATENT DOCUMENTS

| | | |
|---|---|---|
| 2018/0356996 A1* | 12/2018 | Benisty ................ G06F 3/0653 |
| 2019/0129636 A1* | 5/2019 | Benisty ................ G06F 3/0625 |
| 2019/0138081 A1 | 5/2019 | Zeng |
| 2019/0266098 A1 | 8/2019 | Torchalski et al. |
| 2019/0286215 A1 | 9/2019 | Paul et al. |

OTHER PUBLICATIONS

Extended European Search Report, dated Jun. 30, 2021, for corresponding EP Patent Application No. 21155205.4 (14 pages).

* cited by examiner

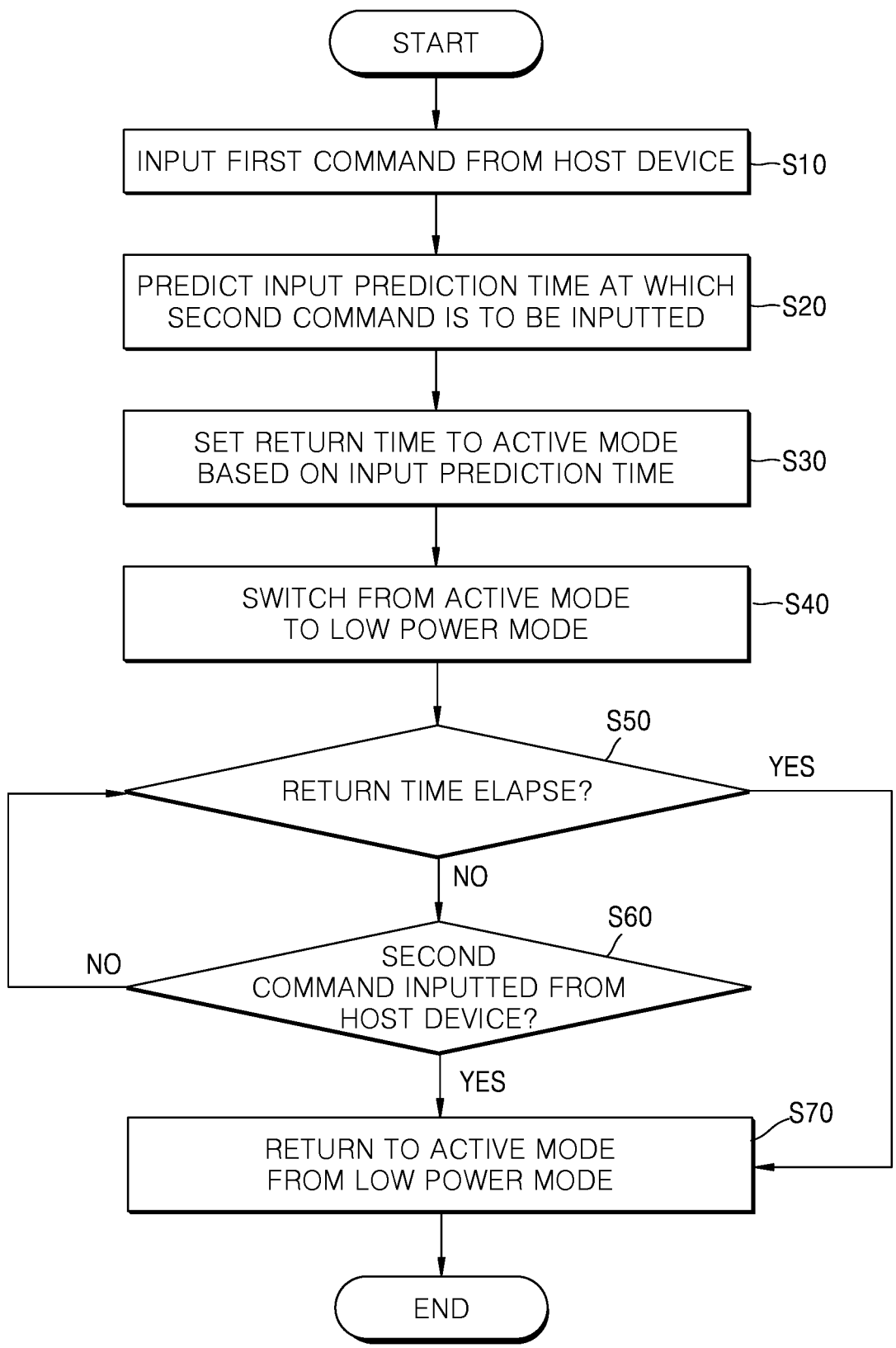

STORAGE DEVICE AND METHOD OF OPERATING THE SAME

CROSS-REFERENCE TO RELATED APPLICATION

This application claims the benefit of priority under 35 U.S.C. § 119 to Korean Patent Application No. 10-2020-0015838, filed on Feb. 10, 2020, in the Korean Intellectual Property Office, the disclosure of which is incorporated herein in its entirety by reference.

BACKGROUND

The present disclosure relates to a storage device and a method of operating the same, and more particularly, to a storage device operating in a plurality of power modes and a method of operating the same.

A nonvolatile memory can retain stored data even when the power is cut off. Recently, storage devices including a flash-based nonvolatile memory such as an embedded multimedia card (eMMC), universal flash storage (UFS), solid state drive (SSD), and a memory card have been widely used, and the storage devices are useful for storing or transferring large amounts of data.

The storage devices operate in an active mode when performing an operation according to a command received from the host device and operate in a low power mode when not performing the operation according to the command received from the host device. The storage devices may reduce power consumption by operating in a low power mode.

SUMMARY

The present disclosure is to provide a storage device for predicting a time point in advance at which the next command is received to convert a power mode, and a method of operating the same.

According to the technical idea of the present disclosure, a storage device operating in a plurality of power modes including an active mode and a low power mode having a lower power consumption than the active mode includes: a nonvolatile memory including a plurality of nonvolatile memory cells; and a storage controller configured to process commands inputted from a host device in the active mode, wherein the storage controller includes a power mode manager configured to adjust the plurality of power modes, and wherein when a first command is inputted, the power mode manager is configured to predict an input prediction time for a second command to be inputted from the host device after the first command, change from the active mode to the low power mode when a processing operation of the first command is completed, and return to the active mode from the low power mode when a set return time elapses according to the input prediction time.

According to the technical idea of the present disclosure, a method of operating a storage device in a plurality of power modes including an active mode and a low power mode having a lower power consumption than the active mode includes: inputting a first command from a host device; predicting an input prediction time at which a second command is to be inputted from the host device after the first command; setting a return time to return to the active mode from the low power mode on a timer based on the input prediction time; switching from the active mode to the low power mode when a processing operation of the first command is completed; and returning from the low power mode to the active mode when the return time elapses.

According to the technical idea of the present disclosure, a storage device operating in a plurality of power modes including an active mode and a low power mode having a lower power consumption than the active mode includes: a nonvolatile memory including a plurality of nonvolatile memory cells; a storage controller configured to process commands inputted from a host device in the active mode; and a power mode manager configured to adjust the plurality of power modes, wherein when a first command is inputted, the power mode manager is further configured to predict an input prediction time for a second command to be inputted from the host device after the first command, change from the active mode to the low power mode when a processing operation of the first command is completed, and return to the active mode from the low power mode when a set return time elapses according to the input prediction time.

BRIEF DESCRIPTION OF THE DRAWINGS

Embodiments of the inventive concept will be more clearly understood from the following detailed description taken in conjunction with the accompanying drawings in which like numbers refer to like elements throughout. In the drawings:

FIG. 3 is a diagram illustrating a method of operating a storage device, according to an exemplary embodiment of the present disclosure;

DETAILED DESCRIPTION OF THE EMBODIMENTS

Hereinafter, embodiments of the present disclosure will be described in detail with reference to the accompanying drawings.

Figure 1:
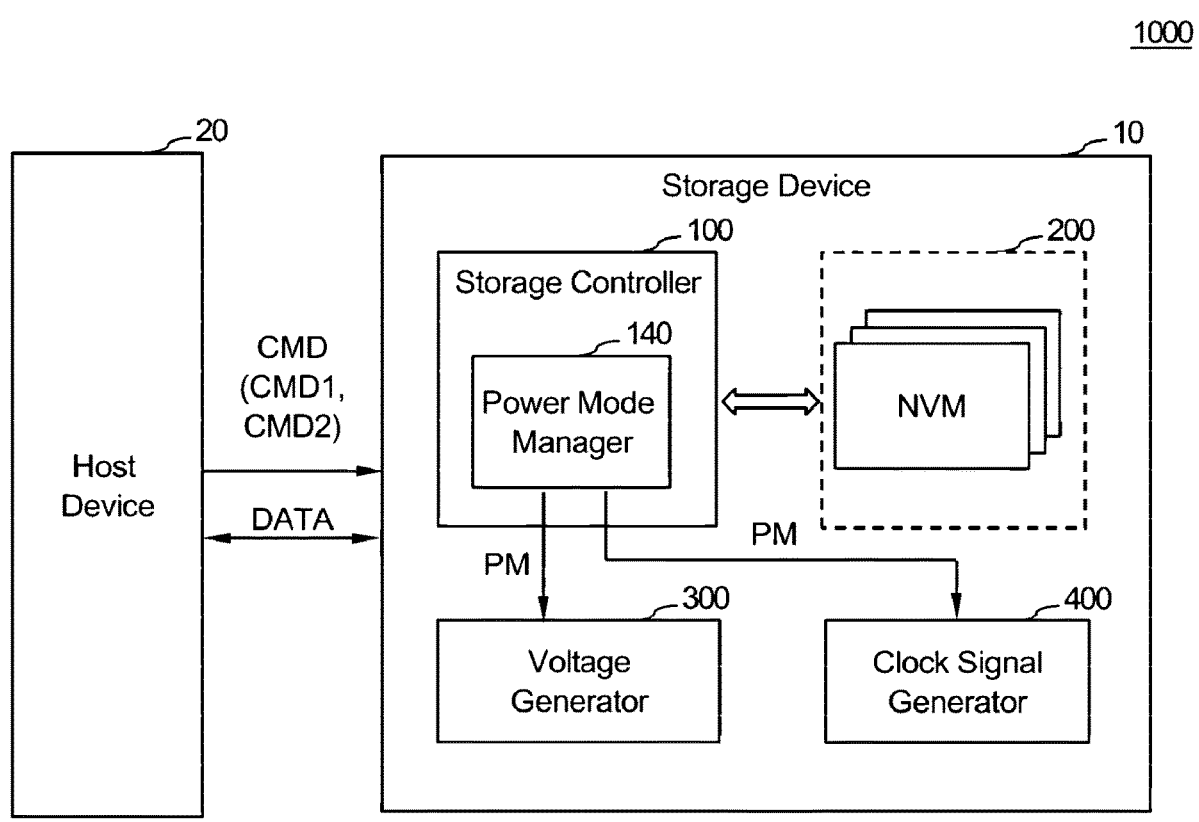
FIG. 1 is a block diagram illustrating a storage system, according to an exemplary embodiment of the present disclosure.

FIG. 1 is a block diagram illustrating a storage system 1000, according to an exemplary embodiment of the present disclosure.

Referring to FIG. 1, the storage system 1000 may include a storage device 10 and a host device 20. The storage system 1000 may be embedded in an electronic device or implemented as an electronic device. For example, electronic devices may be implemented as personal computers (PCs), data servers, Ultra Mobile PCs (UMPCs), workstations, netbooks, network-attached storage (NAS), smart televisions, Internet of Things (IoT) devices, or portable electronic devices. The portable electronic devices may be laptop computers, mobile phones, smartphones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, and wearable devices.

The host device 20 may transmit a command CMD to the storage device 10 and manage overall operations of the storage device 10. The host device 20 may store data in the storage device 10 and read data from the storage device 10. For example, the host device 20 may transmit a write command and write data to the storage device 10 or may transmit a read command to the storage device 10. In an exemplary embodiment, the host device 20 may be implemented as a central processing unit (CPU), a processor, a microprocessor, an application processor (AP), or a system-on-a-chip (SoC).

The storage device 10 may be a solid state drive (SSD), an embedded multimedia card (eMMC), an embedded universal flash storage (UFS) memory device, a UFS memory card, a Compact Flash (CF), Secure Digital (SD) memory, a Micro Secure Digital (Micro-SD) memory, a Mini Secure Digital (Mini-SD) memory, an Extreme Digital (xD) memory, or a Memory Stick. For example, the storage device 10 may be any type of storage device capable of storing data.

The storage device 10 may include a storage controller 100, a nonvolatile memory 200, a voltage generator 300, and a clock signal generator 400. The storage controller 100 may control operations of the nonvolatile memory 200, the voltage generator 300, and the clock signal generator 400.

The storage controller 100 may receive a command CMD including a read command and a write command from the host device 20 and may transmit and receive data DATA to/from the host device 20. The storage controller 100 may control the nonvolatile memory 200 to read data DATA stored in the nonvolatile memory 200 in response to a read command and provide the read data DATA to the host device 20, or the storage controller 100 may control the nonvolatile memory 200 to write data DATA to the nonvolatile memory 200 in response to a write command from the host device 20.

The storage controller 100 may include a power mode manager 140. The power mode manager 140 may generate a mode change signal PM and transmit the mode change signal PM to at least one of the voltage generator 300 and the clock signal generator 400 such that the power mode of the storage device 10 may be changed.

When the command CMD is received, the power mode manager 140 may predict the input prediction time at which the next command CMD will be inputted and change the power mode of the storage device 10 based on the predicted input prediction time. In an exemplary embodiment, the storage controller 100 may receive the first command CMD1 from the host device 20 and then receive the second command CMD2 after a certain time elapses. When the first command CMD1 is inputted from the host device 20, the power mode manager 140 may predict an input prediction time at which the second command CMD2 is predicted to be inputted to the storage device 10 by using workload information corresponding to the first command CMD1. The power mode manager 140 may determine whether to change the power mode from the active mode to the low power mode based on the predicted input prediction time, and set a return time to return to the active mode from the low power mode. For example, the workload information may include the idle history, the size of the command CMD, the type of the command CMD, and/or information on the continuity of the logical block address corresponding to the command CMD.

The nonvolatile memory 200 may be used as a storage medium of the storage device 10. The nonvolatile memory 200 may store data provided from the host device 20. The nonvolatile memory 200 may include a memory cell array including nonvolatile memory cells capable of maintaining stored data even when the storage device 10 is powered off. The memory cell array may be divided into a plurality of memory blocks, and the plurality of memory blocks may have a two-dimensional horizontal structure in which memory cells are two-dimensionally arranged on the same plane (or layer) or a three-dimensional (3D) vertical structure in which nonvolatile memory cells are three-dimensionally arranged. The memory cell may be a single level cell (SLC) storing one bit of data or a multi level cell (MLC) storing two or more bits of data. However, the present invention is not limited thereto, and each memory cell may be a triple level cell (TLC) storing 3-bit data or a quadruple level cell storing 4-bit data.

In an exemplary embodiment, the nonvolatile memory 200 may include a plurality of dies, or a plurality of chips, each of which includes a memory cell array. For example, the nonvolatile memory 200 may include a plurality of chips, and each of the plurality of chips may include a plurality of dies. The nonvolatile memory 200 may also include a plurality of channels, each of which includes a plurality of chips.

In an exemplary embodiment, the nonvolatile memory 200 may be a NAND flash memory device. However, the technical spirit of the present disclosure is not limited thereto, and the nonvolatile memory 200 may include other various types of nonvolatile memories. For example, the nonvolatile memory 200 may include nonvolatile memories, and various types of memories such as Magnetic RAM (MRAM), Spin-Transfer Torque MRAM, Conductive bridging RAM (CBRAM), Ferroelectric RAM (FeRAM), Phase RAM (PRAM), Resistance RAM, Nanotube RAM), Polymer RAM (PoRAM), Nano Floating Gate Memory (NFGM), holographic memory, Molecular Electronics Memory or Insulator Resistance Change Memory, etc. may be applied to the nonvolatile memories.

The voltage generator 300 may receive an external voltage from the host device 20 through an external power line. The voltage generator 300 may generate internal voltages required for each operation of the storage controller 100 and the nonvolatile memory 200 using an external voltage. In an exemplary embodiment, the voltage generator 300 may be implemented as a Power Management Integrated Circuit (PMIC), a Power Management Unit (PMU), and the like. The voltage generator 300 may provide the generated internal voltages to the storage controller 100 and the nonvolatile memory 200.

The voltage generator 300 may adjust the internal voltage provided to each of the storage controller 100 and the nonvolatile memory 200 according to a plurality of power modes. The voltage generator 300 may adjust the internal voltage provided to each of the storage controller 100 and the nonvolatile memory 200 in response to the mode change signal PM received from the power mode manager 140. For example, the voltage generator 300 may provide a voltage to the storage controller 100 and the nonvolatile memory 200 so that the storage device 10 performs an operation according to a command CMD in the active mode. As another example, the voltage generator 300 may not provide a voltage to some of the components of the storage controller 100 in a low power mode, or may not provide a voltage to the nonvolatile memory 200.

The clock signal generator 400 may generate various clock signals used in the storage device 10. In an exemplary embodiment, the clock signal generator 400 may be implemented with an oscillator, a phase locked loop (PLL), a delayed locked loop (DLL), or the like. The clock signal generator 400 may generate a clock signal used in the storage controller 100 and a clock signal used in the nonvolatile memory 200.

The clock signal generator 400 may adjust the frequency of the clock signal provided to each of the storage controller 100 and the nonvolatile memory 200 according to a plurality of power modes. The clock signal generator 400 may adjust the frequency of the clock signal provided to each of the storage controller 100 and the nonvolatile memory 200 in response to the mode change signal PM. For example, the clock signal frequency in the clock active mode may be higher than the clock signal frequency in the low power mode. For example, the clock signal generator 400 may provide a clock signal having a higher frequency to each of the storage controller 100 and the nonvolatile memory 200 in the clock active mode, and the clock signal generator 400 may provide a clock signal having a lower frequency to each of the storage controller 100 and the nonvolatile memory 200 in the low power mode.

Therefore, after the first command CMD1 and the second command CMD2 are inputted continuously, the storage device 10 according to the present disclosure predicts an input prediction time in advance, such that the storage device 10 may return from the low power mode to the active mode in advance before the second command CMD2 is inputted. The power mode manager 140 presets the return time to the active mode, and when the return time elapses, transmits the mode change signal PM to the voltage generator 300 and the clock signal generator 400 such that the power mode is switched from low power mode to active mode. The return time preset by the power mode manager 140 may be the input prediction time predicted by the storage device 10. Therefore, due to the time it takes for the storage device 10 to return from the low power mode to the active mode, latency occurring in processing the second command CMD2 may be reduced.

Figure 2:
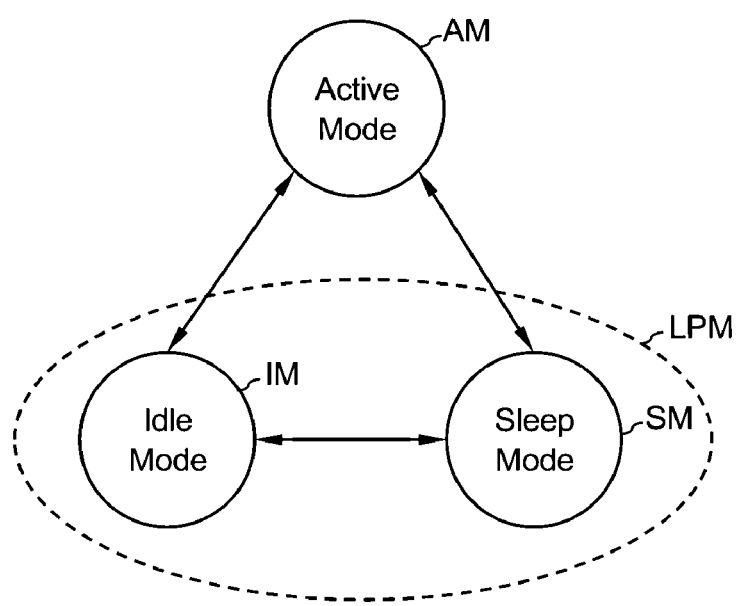
FIG. 2 is a diagram illustrating a plurality of power modes performed by a storage device, according to an exemplary embodiment of the present disclosure.

FIG. 2 is a diagram illustrating a plurality of power modes performed by the storage device 10, according to an exemplary embodiment of the present disclosure.

Referring to FIGS. 1 and 2, the storage device 10 may operate in a plurality of power modes. The plurality of power modes may include an active mode AM and a low power mode LPM. When not performing an operation due to the control of the host device 20, the storage device 10 may switch to a low power mode LPM to reduce power consumption. For example, in the low power mode LPM, an internal voltage may not be provided to at least some of the components included in the storage device 10, and the frequency of the clock signal provided to the components included in the storage device 10 may be reduced. Therefore, in the low power mode LPM, the storage device 10 may not process a command CMD received from the host device 20, and may process a command CMD received from the host device 20 after returning to the active mode AM.

The low power mode LPM may include an idle mode IM and a sleep mode SM. In an exemplary embodiment, after receiving the first command CMD1, according to the input prediction time until receiving the second command CMD2, the storage device 10 may determine whether to change from the active mode AM to the idle mode IM or from the active mode AM to the sleep mode SM. For example, after receiving the first command CMD1, the storage device 10 may determine whether to change from the active mode AM to the idle mode IM or from the active mode AM to the sleep mode SM based on the input prediction time that predicts when the second command CMD2 will be received.

In the sleep mode SM, the power consumption of the storage device 10 may be lower than in the idle mode IM. For example, the number of components of the storage device 10 in which the internal voltage is not provided in the sleep mode SM may be greater than the number of components in which the internal voltage is not provided in the idle mode IM. For example, in relation to the nonvolatile memory 200, the internal voltage is provided from the voltage generator 300 to the nonvolatile memory 200 in the idle mode IM, but the internal voltage may not be provided from the voltage generator 300 to the nonvolatile memory 200 in the sleep mode SM. Also, for example, the storage controller 100 may receive a clock signal having a lower frequency in the active mode AM from the clock signal generator 400 in the idle mode IM, and in the sleep mode SM, an internal voltage may not be provided to elements other than some elements (for example, Always on block) among the components of the storage controller 100.

FIG. 3 is a diagram illustrating a method of operating the storage device 10, according to an exemplary embodiment of the present disclosure.

Referring to FIGS. 1 and 3, in operation S10, the storage device 10 may receive a first command CMD1 from the host device 20. In operation S20, the storage device 10 may predict an input prediction time at which the second command CMD2 is predicted to be inputted to the storage device 10 after the first command CMD1. For example, when the first command CMD1 is received, the power mode manager 140 of the storage controller 100 may calculate the input prediction time of the second command CMD2 using workload information on the first command CMD1.

In operation S30, the storage device 10 may set a return time to return to the active mode AM from the low power mode LPM based on the input prediction time. In operation S40, the storage device 10 may switch from an active mode AM to a low power mode LPM. When the operation corresponding to the first command CMD1 is completed, the storage device 10 may switch from the active mode AM to the low power mode LPM. At this time, the low power mode LPM may include an idle mode IM and a sleep mode SM, and in operation S40, the storage device 10 may switch the power mode to one of the idle mode IM or the sleep mode SM. For example, in operation S40, the power mode manager 140 of the storage controller 100 may generate a mode change signal PM and transmit the generated mode change signal PM to at least one of the voltage generator 300 and the clock signal generator 400.

In operation S50, the storage device 10 may determine whether a return time elapses after switching to the low power mode LPM. When the set return time has elapsed (operation S50, YES), the storage device 10 may return to the active mode AM from the low power mode LPM in operation S70. Accordingly, the storage device 10 may return to the active mode AM from the low power mode LPM in advance before receiving the second command CMD2, and the time required to process the second command CMD2 may be reduced.

When the set return time does not elapse (operation S50, NO), in operation S60, the storage device 10 may determine whether the second command CMD2 is received from the host device 20. Even if the set return time does not elapse, the host device 20 may return to the active mode AM from the low power mode LPM (operation S70) when the second command CMD2 is received from the host device 20 (operation S60, YES). Therefore, even if the set return time does not elapse according to the predicted input prediction time, when the second command CMD2 is received, the storage device 10 may process the second command CMD2 by returning to the active mode AM.

Figure 4A:
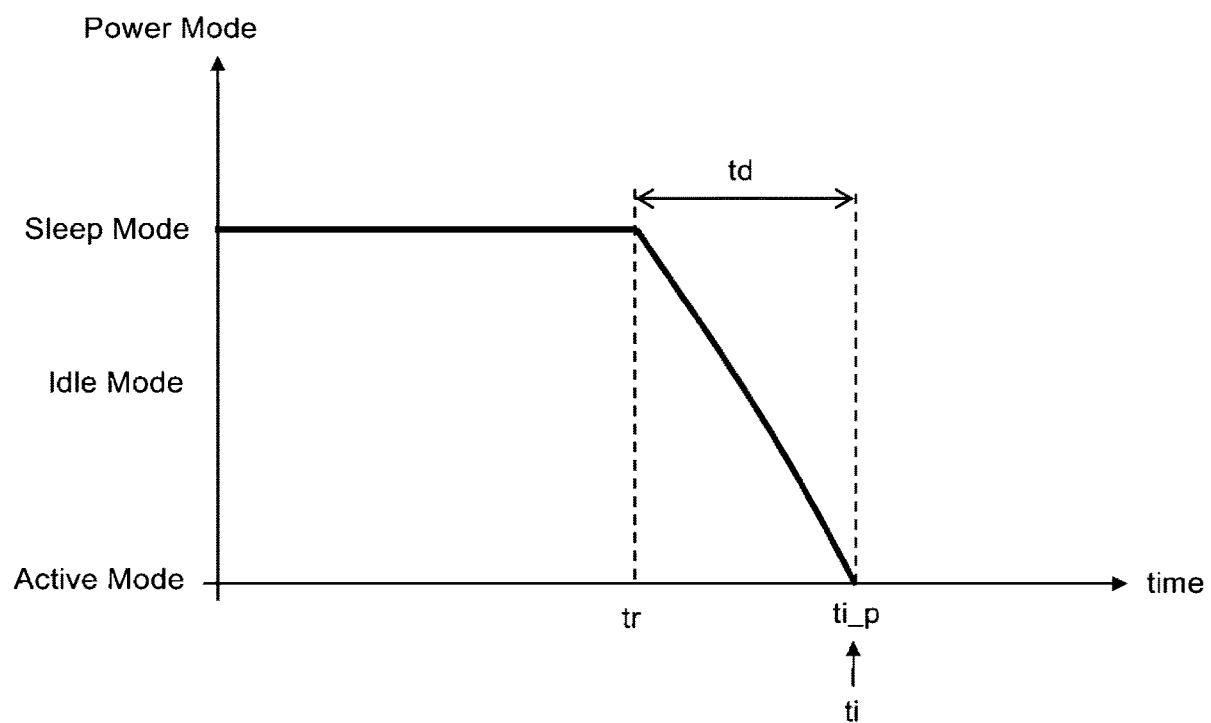
FIG. 4A is a diagram illustrating a time taken for a storage device to return from a sleep mode to an active mode, according to an exemplary embodiment of the present disclosure.
Figure 4B:
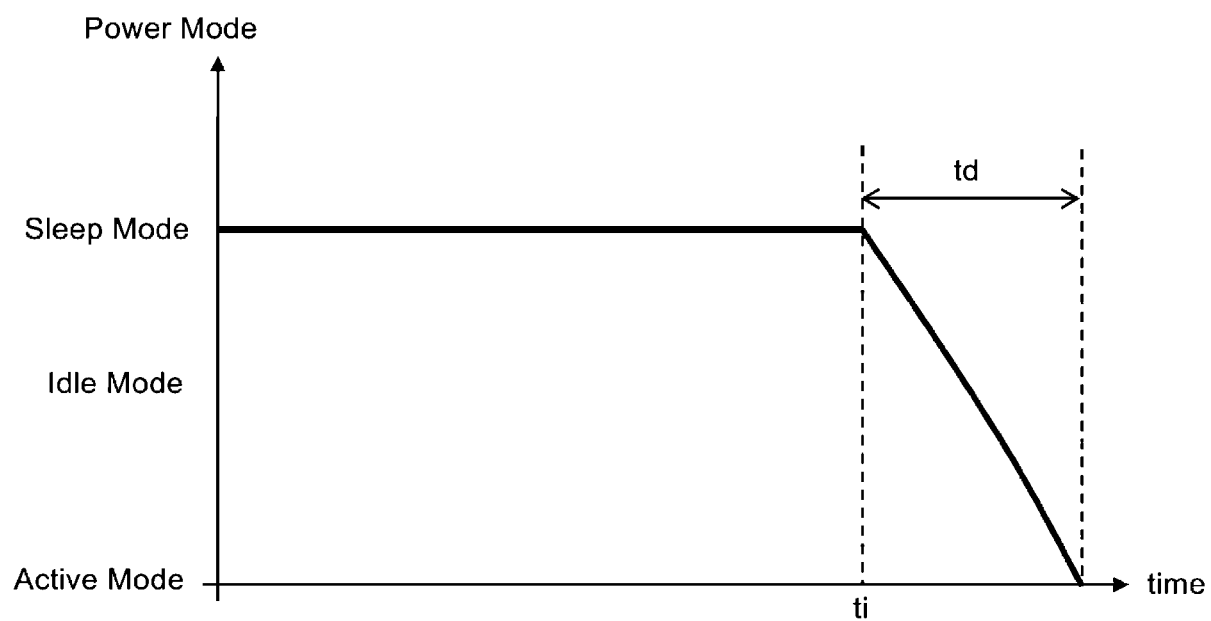
FIG. 4B is a diagram for describing a time taken for a storage device of a comparative example to return from a sleep mode to an active mode, according to an exemplary embodiment of the present disclosure.

FIG. 4A is a diagram illustrating a time taken for a storage device to return from a sleep mode SM to an active mode AM according to an exemplary embodiment of the present disclosure, and FIG. 4B is a diagram for describing a time taken for the storage device of the comparative example to return from the sleep mode SM to the active mode AM. FIGS. 4A and 4B are diagrams for explaining an example of returning from the sleep mode SM to the active mode AM to process the second command.

Referring to FIGS. 1 and 4A, the storage device 10 according to the present disclosure may predict the input prediction time ti_p of the second command CMD2 to be inputted after the first command CMD1 in advance. Considering the input prediction time ti_p and the mode switching time td taken to return from the sleep mode SM to the active mode AM, the storage device 10 may set the return time tr, and after switching from the active mode AM to the sleep mode SM, when the set return time tr elapses, the storage device 10 may return to the active mode AM again. Therefore, the storage device 10 according to the present disclosure returns to the active mode AM at or before the actual reception time ti corresponding to the actual time at which the second command CMD2 is received, so that latency according to the mode switching time td may be reduced, and time taken to perform the second command CMD2 may be reduced.

On the other hand, referring to FIG. 4B, the storage device according to the comparative example performs an operation according to the first command CMD1 and then switches from an active mode AM to a sleep mode SM. When receiving the second command CMD2 following the first command CMD1, the storage device according to the comparative example returns from the sleep mode SM to the active mode AM. Therefore, since the storage device according to the comparative example returns from the sleep mode SM to the active mode AM after the actual reception time ti when the second command CMD2 is received, the storage device may perform an operation according to the second command CMD2 after a mode switching time td for returning from the sleep mode SM to the active mode AM is taken. The latency according to the mode switching time td may be generated, and the time taken to perform the operation according to the second command CMD2 may be increased. For example, the time taken to perform the operation according to the second command CMD2 may be increased by the mode switching time td.

Figure 5:
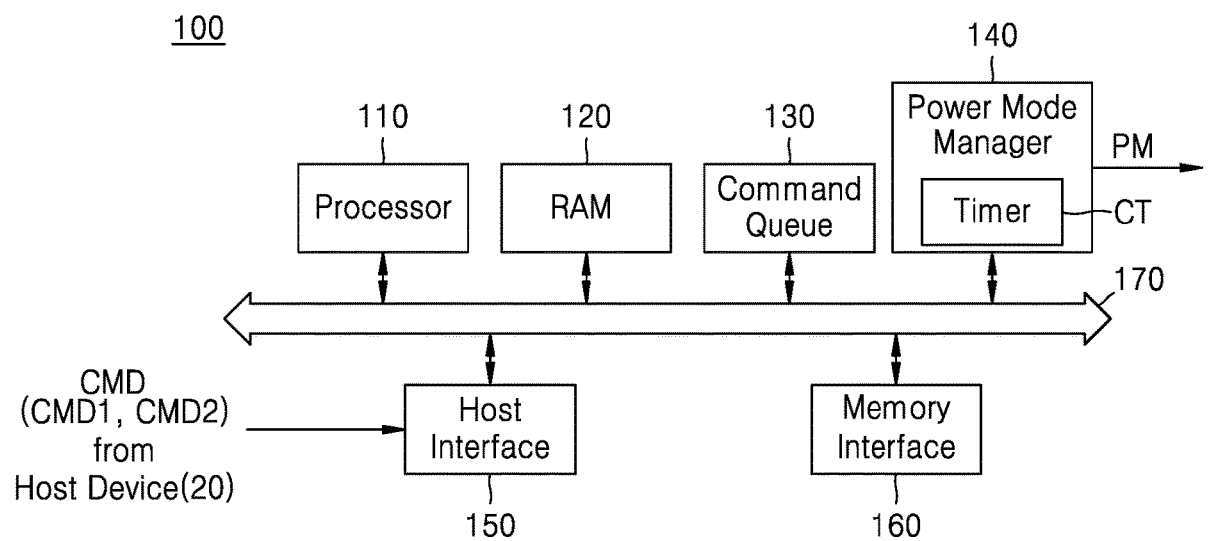
FIG. 5 is a block diagram illustrating a storage controller, according to an exemplary embodiment of the present disclosure.

FIG. 5 is a block diagram illustrating a storage controller 100 according to an exemplary embodiment of the present disclosure.

Referring to FIG. 5, the storage controller 100 may include a processor 110, random access memory (RAM) 120, a command queue 130, a power mode manager 140, a host interface 150, and a memory interface 160. The components of the storage controller 100 (e.g., the processor 110, the RAM 120, the command queue 130, the power mode manager 140, the host interface 150, and the memory interface 160) may communicate with each other through a bus 170.

The processor 110 may include a central processing unit (CPU) or a microprocessor and may control the overall operation of the storage controller 100. In an exemplary embodiment, the processor 110 may be implemented as a multi-core processor, for example, a dual-core processor or a quad-core processor.

The RAM 120 operates under the control of the processor 110 and may be used as an operation memory, a buffer memory, and/or a cache memory. For example, the RAM 120 may be implemented with volatile memory such as DRAM and static RAM (SRAM) or nonvolatile memory such as PRAM and flash memory. The RAM 120 may store firmware and data for controlling the storage controller 100. The stored firmware and data may be driven or processed by the processor 110. The software layer structure of the storage controller 100 implemented by firmware may include an interface layer, a Flash Translation Layer (FTL), and the like.

Commands CMD may be received by the host interface 150 from the host device 20, and the host interface 150 may transfer the received commands CMD to the command queue 130 via the bus 170. The command queue 130 may store commands CMD received from the host device 20. For example, a plurality of write commands received from the host device 20 may be enqueued in the command queue 130, and a plurality of read commands received from the host device 20 may be enqueued in the command queue 130. The storage controller 100 may further include a command scheduler (not shown), and the command scheduler may provide a plurality of enqueued write commands and a plurality of read commands to a nonvolatile memory (e.g., 200 in FIG. 1) in an in-order or out-of-order manner.

The command queue 130 may be implemented in software (or firmware) or hardware. Alternatively, the command queue 130 may be implemented by a combination of software and hardware. When the command queue 130 is implemented in software, instructions of a program constituting the command queue 130 may be loaded into the RAM 120 and may be executed by the processor 110.

When the first command CMD1 is received from the host device 20, the power mode manager 140 may predict an input prediction time at which the next second command CMD2 is expected to be inputted to the storage controller 100 by using workload information corresponding to the first command CMD1. For example, the workload information may include an idle history in which an idle time is recorded, which is an interval between times when each of commands CMD is received by the storage controller 100. Further, the workload information may include the size of the command CMD, the type of the command CMD, or the information on the continuity of the logical block address corresponding to the command CMD.

The power mode manager 140 may determine whether to switch the power mode from the active mode AM to the low power mode LPM based on the predicted input prediction time, and when determining the power mode switching, set a return time to return from the low power mode LPM to the active mode AM. In an exemplary embodiment, the power mode manager 140 may include a timer CT, and the timer CT may set a return time. The power mode manager 140 may generate a mode change signal PM when the set return time elapses, and may transmit the mode change signal PM via the bus 170 to at least one of the voltage generator 300 and the clock signal generator 400 such that the power mode of the storage device 10 may be changed.

In an exemplary embodiment, the power mode manager 140 may predict an input prediction time using workload information by executing an application. At this time, the application may include a plurality of data operations related to performing prediction, for example, arithmetic operations, convolution operations, polling operations, and the like. For example, the power mode manager 140 may perform a task based on a neural network, and the application may include a neural network model. The neural network model may include a plurality of data operations, which are based on at least one of Convolution Neural Network (CNN), Region with Convolution Neural Network (R-CNN), Region Proposal Network (RPN), Recurrent Neural Network (RNN), Stacking-based deep Neural Network (S-DNN), State-Space Dynamic Neural Network (S-SDNN), Deconvolution Network, Deep Belief Network (DBN), Restricted Boltzmann Machine (RBM), Fully Convolutional Network, Long Short-Term Memory (LSTM) Network, Classification Network, and various types of neural networks, and the inputs, output sizes and weights, biases, and the like of the plurality of data operations.

In an exemplary embodiment, the power mode manager 140 may be implemented with a Graphics Processing Unit (GPU), a Digital Signal Processor (DSP), a Field Programmable Gate Array (FPGA), or a Neural Processing Unit (NPU). However, the present invention is not limited thereto, and the power mode manager 140 may be implemented with various types of acceleration circuits (accelerators) that perform the tasks required for performing assigned tasks, that is, performing prediction.

However, the storage device 10 according to the present disclosure is not limited to the power mode manager 140 including a processor or a processing unit. The processor included in the storage controller 100 may execute the power mode manager 140 implemented in software to predict an input prediction time using workload information.

The host interface 150 may be configured to communicate with the external host device 20 under the control of the processor 110. The host interface 150 may receive a command CMD from the host device 20. At least one of various interface schemes may be applied to the host interface 150 and the various interfaces may include Universal Serial Bus (USB), AT Attachment (ATA), Serial AT Attachment (SATA), Parallel AT Attachment (PATA), Serial Attached SCSI (SAS), High Speed Interchip (HSIC), Small Computer System Interface (SCSI), Peripheral Component Interconnection (PCI), PCI express (PCIe), Universal Flash Storage (UFS), Secure Digital (SD), MultiMedia Card (MMC), embedded MMC (eMMC), Dual In-line Memory Module (DIMM), Registered DIMM (RDIMM), Load Reduced DIMM (LRDIMM), Enhanced Small Disk Interface (ESDI), Integrated Drive Electronics (IDE), and the like.

The memory interface 160 may provide an interface between the storage controller 100 and the nonvolatile memory 200. For example, an internal command according to the command CMD received from the host device 20 may be transmitted to the nonvolatile memory 200 through the memory interface 160, and write data and read data may be transmitted and received between the storage controller 100 and the nonvolatile memory 200 through the memory interface 160.

Figure 6:
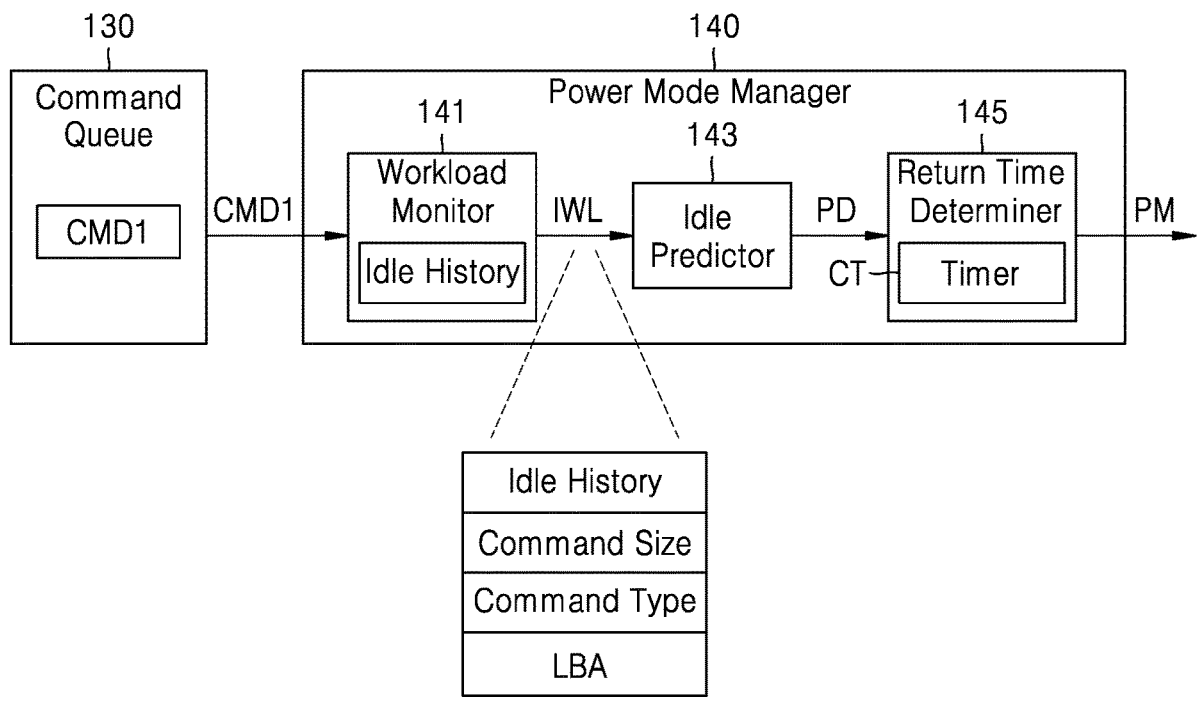
FIG. 6 is a block diagram showing a power mode manager, according to an exemplary embodiment of the present disclosure.

FIG. 6 is a block diagram showing a power mode manager 140 according to an exemplary embodiment of the present disclosure.

Referring to FIGS. 5 and 6, the power mode manager 140 may generate a mode change signal PM by receiving a command enqueued from the command queue 130, for example, a first command CMD1. Alternatively, the power mode manager 140 may obtain command information on the first command CMD1 enqueued in the command queue 130 to generate a mode change signal PM. The power mode manager 140 may include a workload monitor 141, an idle predictor 143, and a return time determiner 145.

The workload monitor 141 may monitor the first command CMD1 inputted to the storage controller 100. Workload information may be stored in the workload monitor 141, and the workload monitor 141 may output workload information IWL corresponding to the first command CMD1. The workload information IWL may include idle history, command size (e.g., size of the first command CMD1), command type (e.g., type of the first command CMD1), logical block address (LBA) information (e.g., information on the continuity of the logical block address corresponding to the first command CMD1).

For example, the workload monitor 141 may record information on input/output between the host device and the storage device. For example, the workload monitor 141 may collect information on idle time taken until a next command is inputted after a specific command is inputted and may store the collected information as an idle history.

Also, for example, when the first command CMD1 is received, the workload monitor 141 transmits the size of the first command CMD1, the type of the first command CMD1, or the information on the continuity of the logical block address corresponding to the first command CMD1 to the idle predictor 143 as workload information IWL corresponding to the first command CMD1. The size of the first command CMD1 may vary depending on the size of data according to the first command CMD1, and the type of the first command CMD1 may indicate whether it is a read command, a write command, or another command. The information on the continuity of the logical block address corresponding to the first command CMD1 may refer to information on continuity between a logical block address corresponding to a command inputted before the first command CMD1 and a logical block address corresponding to a first command CMD1.

The idle predictor 143 may perform an operation for predicting an input prediction time at which the second request CMD2, that is, the next request, is received using the workload information IWL of the first command CMD1. The idle predictor 143 may output prediction result data PD according to an operation result. In an exemplary embodiment, the idle predictor 143 may perform a plurality of data operations related to performing prediction, for example, arithmetic operations, convolution operations, polling operations, and the like. For example, the power mode manager 140 may perform a task based on a neural network, and the application may include a neural network model.

The return time determiner 145 may determine a return time point using the prediction result data PD and may generate a mode change signal PM according to the determined return time point. The return time determiner 145 may determine the return time point considering the input prediction time and the time it takes for the storage device to switch the power mode.

For example, the return time determiner 145 may include a timer CT, and the return time determiner 145 may set a return time point on the timer CT. The return time determiner 145 may generate a mode change signal PM to switch the power mode from the low power mode LPM to the active mode AM when the return time point set in the timer CT elapses.

In an exemplary embodiment, each of the workload monitor 141, the idle predictor 143, and the return time determiner 145 may be implemented in software, and each of the workload monitor 141, the idle predictor 143, and the return time determiner 145 is driven by the processing unit included in the power mode manager 140 to perform the above-described operations. Alternatively, in an exemplary embodiment, each of the workload monitor 141, the idle predictor 143, and the return time determiner 145 may be implemented in software, and each of the workload monitor 141, the idle predictor 143, and the return time determiner 145 is driven by the external processing unit of the power mode manager 140 to perform the operations.

Figure 7A:
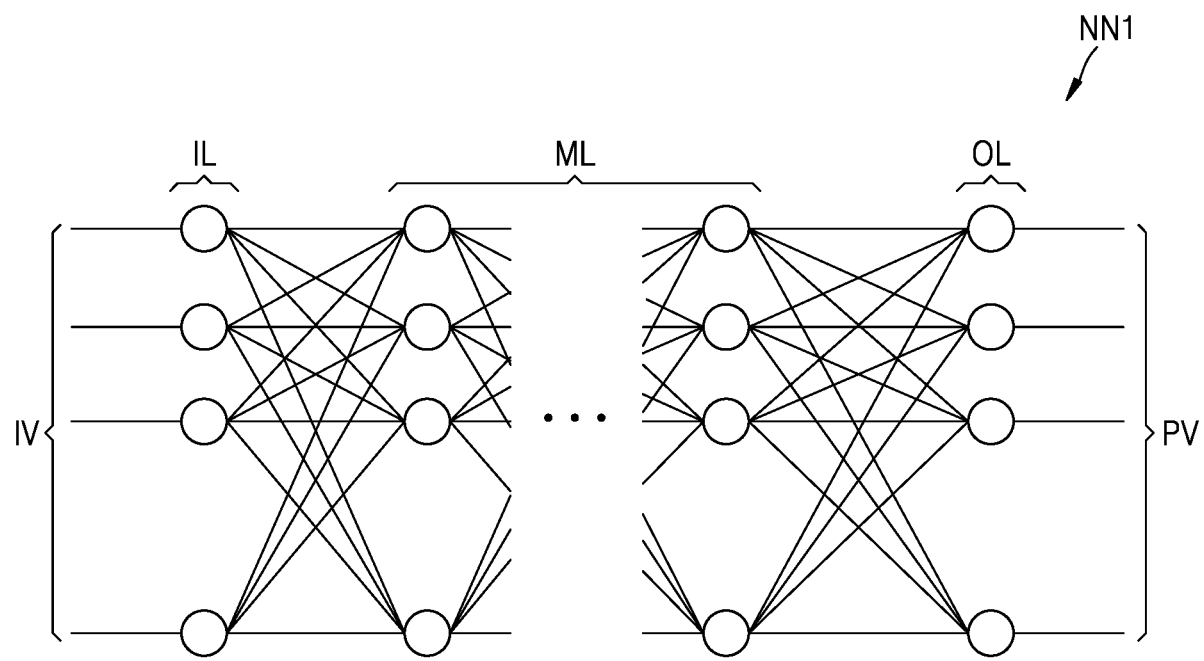
FIGS. 7A and 7B are diagrams for explaining the operation of an idle predictor including a neural network model, according to an exemplary embodiment of the present disclosure.
Figure 7B:
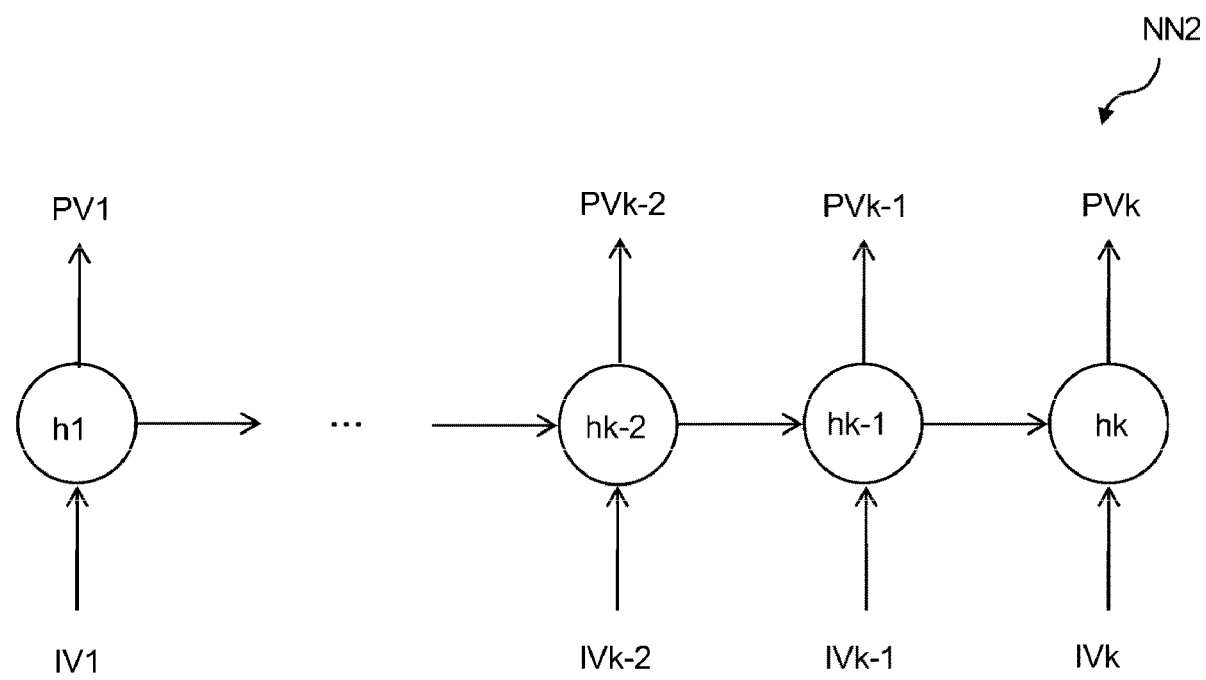

FIGS. 7A and 7B are diagrams for explaining the operation of an idle predictor including neural network models NN1 and NN2.

Referring to FIGS. 7A and 7B, the idle predictor (e.g., idle predictor 143 in FIG. 6) may be implemented as a neural network model NN1 or NN2 and may predict an input prediction time. The neural network model NN1 or NN2 may be implemented in software executed by a processing unit included in a storage device (e.g., storage device 10). The neural network model NN1 of FIG. 7A and the neural network model NN2 of FIG. 7B are examples only, and the idle predictor 143 is not limited thereto, and may be implemented as various models.

Referring to FIG. 7A, the neural network model NN1 may include a multi layer including an input layer IL, one or more middle layers ML, and an output layer OL. The input layer IL may receive an input value IV (e.g., workload information IWL of FIG. 6), and the output layer OL may generate a predicted output value PV (e.g., prediction result data PD of FIG. 6). The neural network model NN1 may be a deep neural network (DNN).

Each layer of the neural network model NN1 may include a plurality of nodes, which are also referred to herein as neurons. Each node or neuron may represent a unit of operation with one or more inputs and outputs. Each input from a plurality of nodes in a layer may be supplied from each node in an adjacent layer. Similarly, the output may be supplied to a plurality of nodes in an adjacent layer.

In an exemplary embodiment, the input layer IL may have 1 nodes, and each of the middle layers ML may have m nodes, and the output layer OL may have n nodes. Each node in the network may be connected to all nodes in the adjacent layer. The number of nodes 1, m, and n may be the same or different from each other depending on the application of the neural network model NN1. Although only two middle layers ML having the same number of nodes are shown in the present disclosure, any number of middle layers and a different number of nodes of each of the middle layers may exist without departing from the scope of the present invention.

Referring to FIG. 7B, in the neural network model NN2, a plurality of neurons may be arranged in one or more layers. Neurons in a particular layer may receive input from one or more neurons in the previous layer, generate output (called "activation") to be transmitted to one or more neurons in the next layer of the neural network model NN2, or generate an output value PVk in the case of the last layer hk of the neural network model NN2. The output value PVk is the prediction result data PD of FIG. 6 and may be provided to the return time determiner 145 of FIG. 6.

The neural network model NN2 may include a plurality of hidden layers h1 to hk. The plurality of hidden layers h1 to hk may be connected to each other to use a previous output value. The last layer hk among the plurality of hidden layers h1 to hk may output an output value PVk. The neural network model NN2 may be a Recurrent Neural Network (RNN).

The input values IV2 to IVk may correspond to the previous output values PV1 to PVk-1, respectively. Each of the input values IV2 to IVk may be obtained from the idle history of the workload information IWL of FIG. 6. Therefore, the output value PVk may be used as an input value in the next operation.

Figure 8:
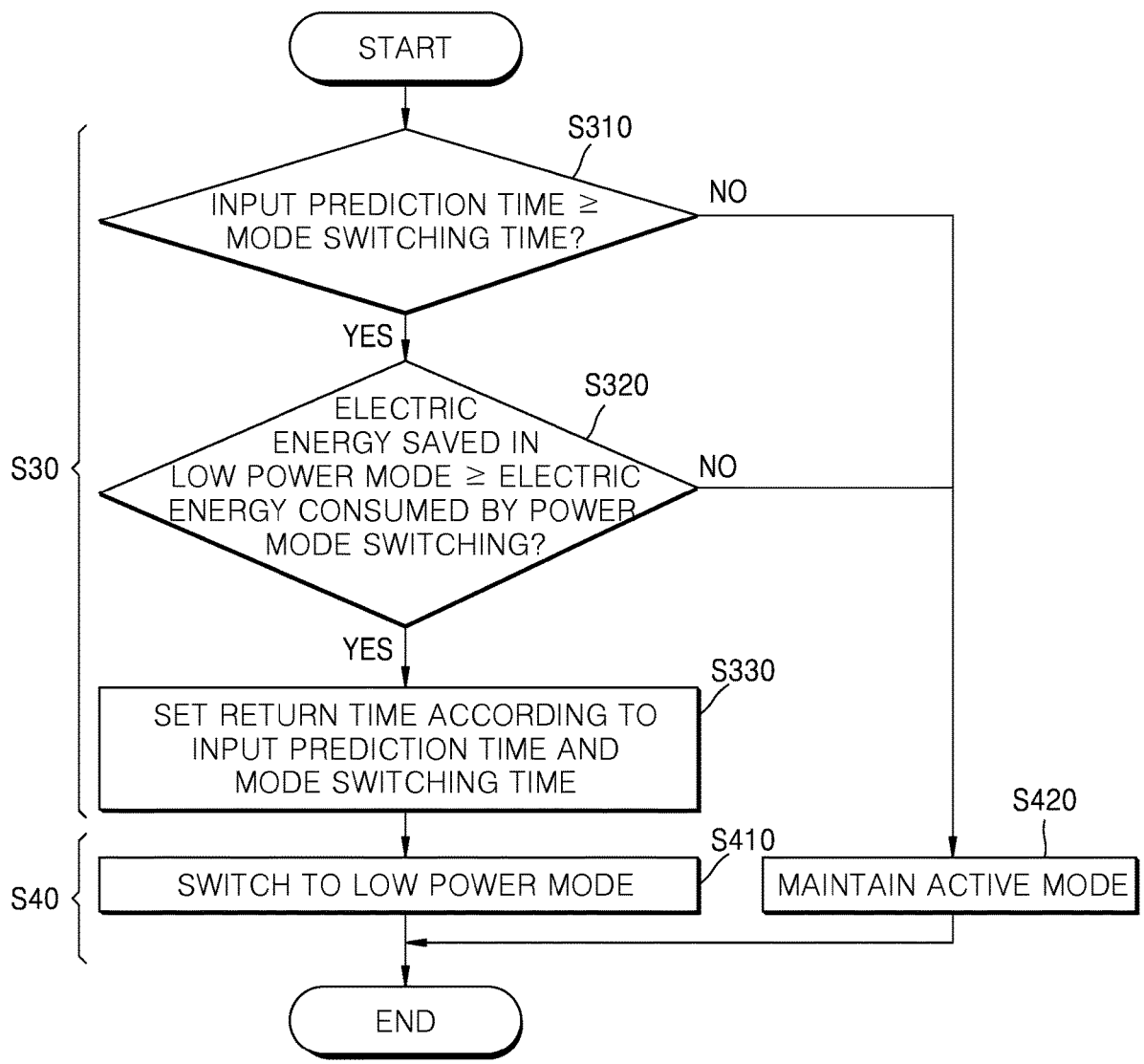
FIG. 8 is a diagram illustrating a method of operating a storage device, according to an exemplary embodiment of the present disclosure.

FIG. 8 is a diagram illustrating a method of operating the storage device 10, according to an exemplary embodiment of the present disclosure. Operation S30 of FIG. 8 is an example of operation S30 of FIG. 3, and operation S30 may include operations S310 to S330. Operation S40 of FIG. 8 is an example of operation S40 of FIG. 3, and operation S40 may include operation S410 and operation S420. In an exemplary embodiment, operation S30 of FIG. 8 may be performed by the return time determiner 145 of FIG. 6.

Referring to FIGS. 1 and 8, in operation S310, the storage device 10 may determine whether the input prediction time is equal to or greater than the mode switching time. For example, the storage device 10 may determine whether the input prediction time for the second command CMD to be inputted to the storage device 10 after the first command CMD1 is greater than a mode switching time for the storage device 10 to switch from a low power mode LPM to an active mode AM.

If the input prediction time is less than the mode switching time (operation S310, NO), in operation S420, the storage device 10 may maintain the active mode AM without switching the power mode from the active mode AM to the low power mode LPM. When it is predicted to receive the second command CMD2 within a relatively fast time after receiving the first command CMD1, the storage device 10 does not switch the power mode, so that latency due to the time it takes to switch the power mode may be reduced.

If the input prediction time is equal to or greater than the mode switching time (operation S310, YES), in operation S320, the storage device 10 may determine whether the electrical energy saved in the low power mode LPM is equal to or greater than the electrical energy consumed by switching the power mode. The storage device 10 may have greater power consumption in the active mode AM than power consumption in the low power mode LPM. Therefore, as the time for the storage device 10 to maintain the low power mode LPM increases, electric energy savings may increase. For example, the electrical energy saved in the low power mode LPM may be calculated by multiplying a value obtained by subtracting the power consumption in the low power mode LPM from the power consumption in the active mode AM by a time maintaining the low power mode LPM.

In addition, the storage device 10 may consume power to switch from the active mode AM to the low power mode LPM and may consume power to return to the active mode AM from the low power mode LPM. When the electric energy saved in the low power mode LPM is less than the electric energy consumed by switching the power mode (operation S320, NO), in operation S420, the storage device 10 may maintain the active mode AM without switching the power mode from the active mode AM to the low power mode LPM. Therefore, even if the input prediction time is greater than the mode switching time and if it is determined that there is no effect of saving electrical energy, the active mode AM may be maintained without changing the power mode.

When the electric energy saved in the low power mode LPM is equal to or greater than the electric energy consumed by switching the power mode (operation S320, YES), in operation S330, the storage device 10 may set a return time to return to the active mode AM from the low power mode LPM according to the input prediction time and the mode switching time. For example, the return time may be calculated by subtracting the mode switching time from the input prediction time.

In operation S410, the storage device 10 may switch from an active mode AM to a low power mode LPM. When the return time set in operation S330 elapses, the storage device 10 may return to the active mode AM from the low power mode LPM.

Figure 9:
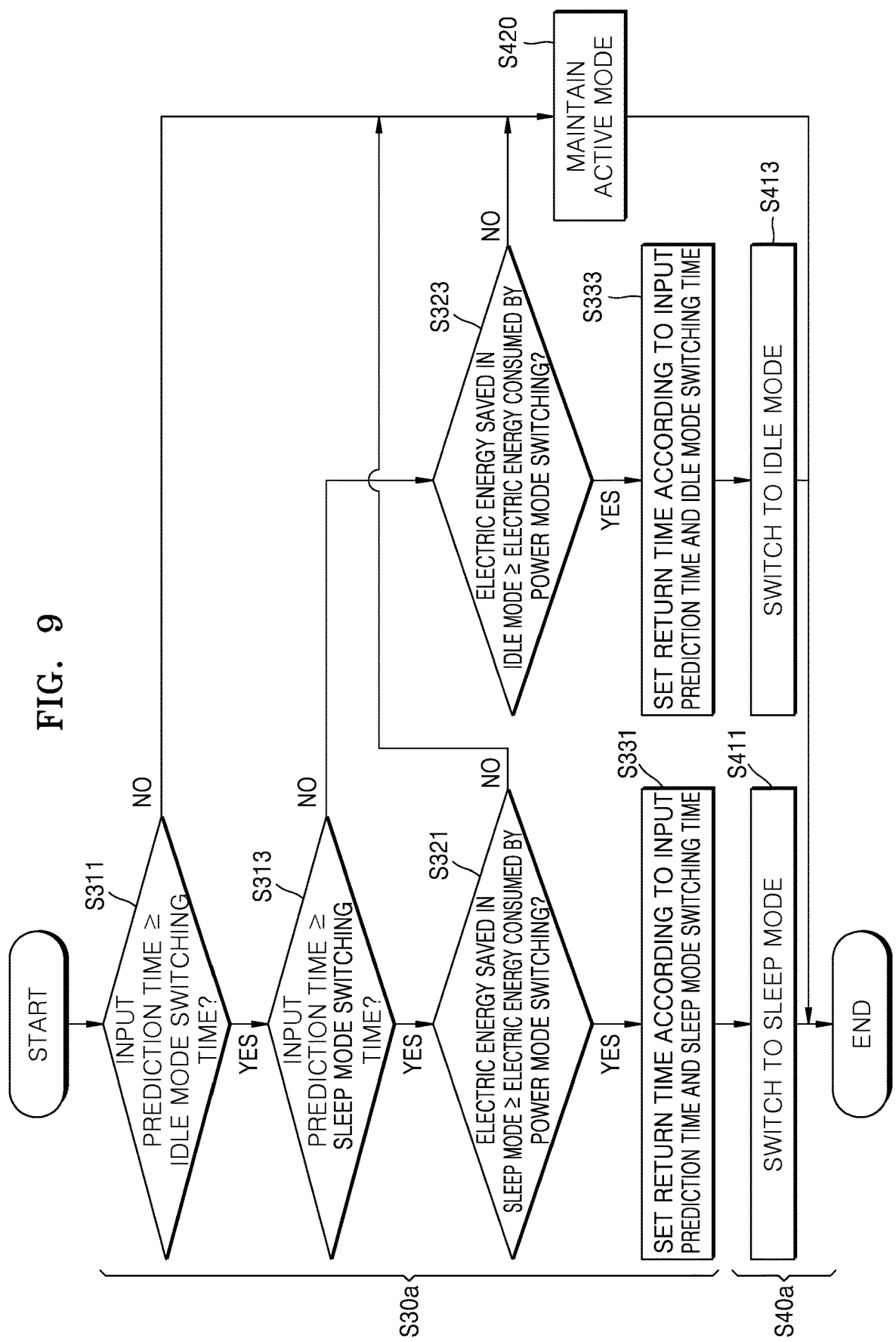
FIG. 9 is a diagram illustrating a method of operating a storage device, according to an exemplary embodiment of the present disclosure.

FIG. 9 is a diagram illustrating a method of operating the storage device 10, according to an exemplary embodiment of the present disclosure. Operation S30a of FIG. 9 is an example of operation S30 of FIG. 3, and operation S30a may include operations S311, S313, S321, S323, S331, and S333. Operation S40a of FIG. 9 is an example of operation S40 of FIG. 3, and operation S40a may include operations S411, S413, and S420. In an exemplary embodiment, operation S30a of FIG. 9 may be performed by the return time determiner 145 of FIG. 6.

In an exemplary embodiment, the low power mode LPM may include an idle mode IM and a sleep mode SM. The storage device 10 may have lower power consumption in the sleep mode SM than power consumption in the idle mode IM.

Referring to FIGS. 1 and 9, in operation S311, the storage device 10 may determine whether the input prediction time is equal to or greater than the idle mode switching time. When the storage device 10 determines that the input prediction time is equal to or greater than the idle mode switching time (operation S311, YES), in operation S313, the storage device 10 may determine whether the input prediction time is equal to or greater than the sleep mode switching time. In an exemplary embodiment, the idle mode switching time for switching from an idle mode IM to an active mode AM may be less than the sleep mode switching time for switching from a sleep mode SM to an active mode AM.

If the input prediction time is less than the idle mode switching time (operation S311, NO), in operation S420, the storage device 10 may maintain the active mode AM without switching the power mode from the active mode AM to the low power mode LPM. When it is predicted to receive the second command CMD2 within a relatively fast time after receiving the first command CMD1, the storage device 10 does not switch the power mode, so that latency due to the time it takes to switch the power mode may be reduced.

When the input prediction time is equal to or greater than the sleep mode switching time (operation S313, YES), in operation S321, the storage device 10 may determine whether the electrical energy saved in the sleep mode SM is equal to or greater than the electrical energy consumed by switching the power mode. As the time for the storage device 10 to maintain the sleep mode SM increases, electric energy saving may increase. For example, the electrical energy saved in the sleep mode SM may be calculated by multiplying a value obtained by subtracting the power consumption in the sleep mode SM from the power consumption in the active mode AM by a time maintaining the sleep mode SM.

When the electric energy saved in the sleep power mode is equal to or greater than the electric energy consumed by switching the power mode (operation S321, YES), in operation S331, the storage device 10 may set a return time to return to the active mode AM from the sleep mode SM according to the input prediction time and the sleep mode switching time. For example, the return time may be calculated by subtracting the sleep mode switching time from the input prediction time. In operation S411, the storage device 10 may switch from an active mode AM to a low power mode LPM. When the return time set in operation S331 elapses, the storage device 10 may return to the active mode AM from the sleep mode SM.

When the electric energy saved in the sleep mode SM is less than the electric energy consumed by switching the power mode (operation S321, NO), in operation S420, the storage device 10 may maintain the active mode AM without switching the power mode from the active mode AM to the sleep mode SM. Even if the input prediction time is equal to or greater than the sleep mode switching time, if it is determined that there is no effect of saving electrical energy (operation S321, NO), the active mode AM may be maintained without changing the power mode (operation S420).

When the input prediction time is less than the sleep mode switching time (operation S313, NO) and equal to or greater than the idle mode switching time (operation S311, YES), in operation S323, the storage device 10 may determine whether the electrical energy saved in the idle mode IM is greater than the electrical energy consumed by switching the power mode. As the time for the storage device 10 to maintain the idle mode IM increases, electric energy saving may increase. For example, the electrical energy saved in the idle mode IM may be calculated by multiplying a value obtained by subtracting the power consumption in the idle mode IM from the power consumption in the active mode AM by a time maintaining the idle mode IM.

When the electric energy saved in the idle power mode is equal to or greater than the electric energy consumed by switching the power mode (operation S323, YES), in operation S333, the storage device 10 may set a return time to return from the idle mode IM to the active mode AM according to the input prediction time and the idle mode switching time. For example, the return time may be calculated by subtracting the idle mode switching time from the input prediction time. In operation S413, the storage device 10 may switch from an active mode AM to an idle mode IM. When the return time set in operation S333 elapses, the storage device 10 may return to the active mode AM from the idle mode IM.

When the electric energy saved in the idle mode IM is less than the electric energy consumed by switching the power mode (operation S323, NO), in operation S420, the storage device 10 may maintain the active mode AM without switching the power mode from the active mode AM to the idle mode IM. Even if the input prediction time is equal to or greater than the idle mode switching time (operation S311, YES) and the input prediction time is less than the sleep mode switching time (operation S313, NO), if it is determined that there is no effect of saving electrical energy (operation S323, NO), the active mode AM may be maintained without changing the power mode (operation S420).

Figure 10:
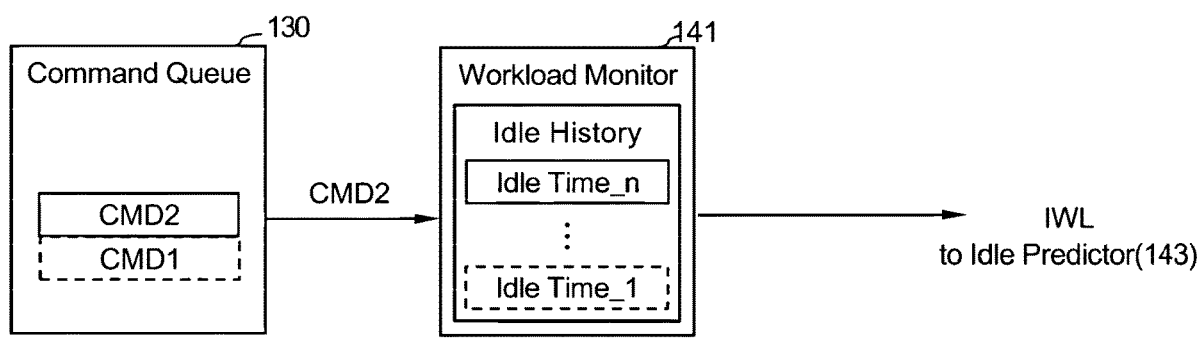
FIG. 10 is a view for explaining the operation of a workload monitor, according to an exemplary embodiment of the present disclosure.

FIG. 10 is a view for explaining the operation of the workload monitor 141, according to an exemplary embodiment of the present disclosure.

Referring to FIG. 10, the workload monitor 141 may receive a command enqueued from the command queue 130 and may store an idle history corresponding to the command. The idle history may include information on idle times taken until the storage device receives a specific command from the host device and then receives the next command and thus, the idle history may include information on first to n-th idle times (e.g., Idle Time_1 to Idle Time_n), and information on the idle time stored in the workload monitor 141 may gradually increase as time passes.

For example, when the first command CMD1 and the second command CMD2 are sequentially received in the command queue 130, information on the n-th idle time (e.g., Idle Time_n) from when the first command CMD1 is inputted until the second command CMD2 is inputted may be stored in the workload monitor 141 as an idle history. When a new command is received by the storage device 10 after the second command CMD2, the workload monitor 141 may transmit the idle history including information on the n-th idle time (e.g., Idle Time_n) to the idle predictor 143 as the workload information IWL.

Figure 11:
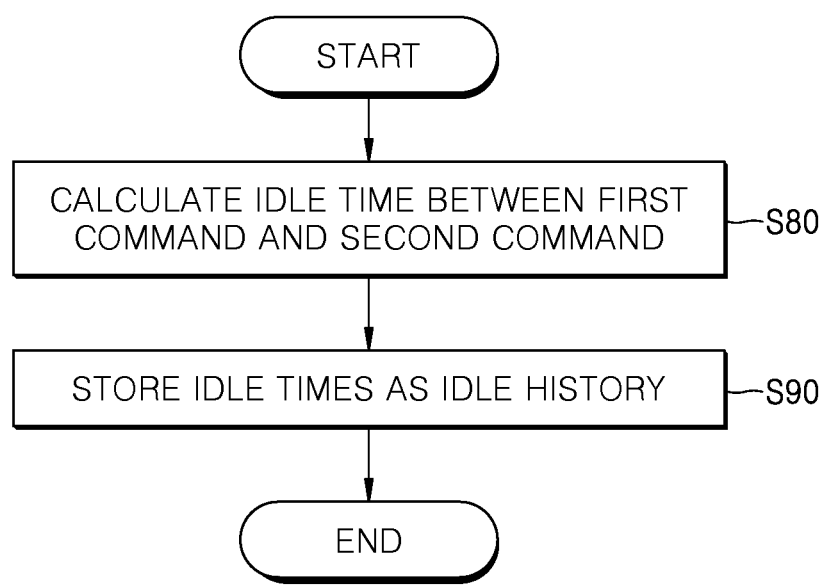
FIG. 11 is a diagram illustrating a method of operating a storage device, according to an exemplary embodiment of the present disclosure.

FIG. 11 is a diagram illustrating a method of operating the storage device 10, according to an exemplary embodiment of the present disclosure. Operations S80 and S90 of FIG. 11 may be performed after operation S70 of FIG. 3, and in an exemplary embodiment, operations S80 and S90 of FIG. 11 may be performed by the workload monitor 141 of FIG. 10.

Referring to FIGS. 1 and 11, in operation S80, the storage device 10 may calculate an idle time between the first command CMD1 and the second command CMD2. For example, the storage device may calculate the idle time between the time point the first command CMD1 is received and the time point the second command CMD2 is received. The storage device 10 may receive the first command CMD1 and then may receive the second command CMD2. At this time, the storage device 10 may maintain an active mode AM after receiving the first command CMD1 and perform an operation of processing the second command CMD2 when the second command CMD2 is inputted. Alternatively, after performing an operation for processing the first command CMD1, the storage device 10 may change the power mode from the active mode AM to the low power mode LPM, and then return to the active mode AM to process the second command CMD2.

In operation S90, the storage device 10 may store information on the idle time calculated in operation S80 as the idle history in the power mode manager 140, that is, the idle history of the power mode manager 140 may be updated. The idle history may be used by the storage device 10 to predict the input prediction time at which the third command is predicted to be inputted following the second command CMD2. Therefore, in relation to the storage device 10 according to the present disclosure, as the number of commands CMD received from the host device 20 increases, an idle history may be updated gradually, and the accuracy of predicting the input prediction time at which the next command CMD will be inputted may be increased.

Figure 12:
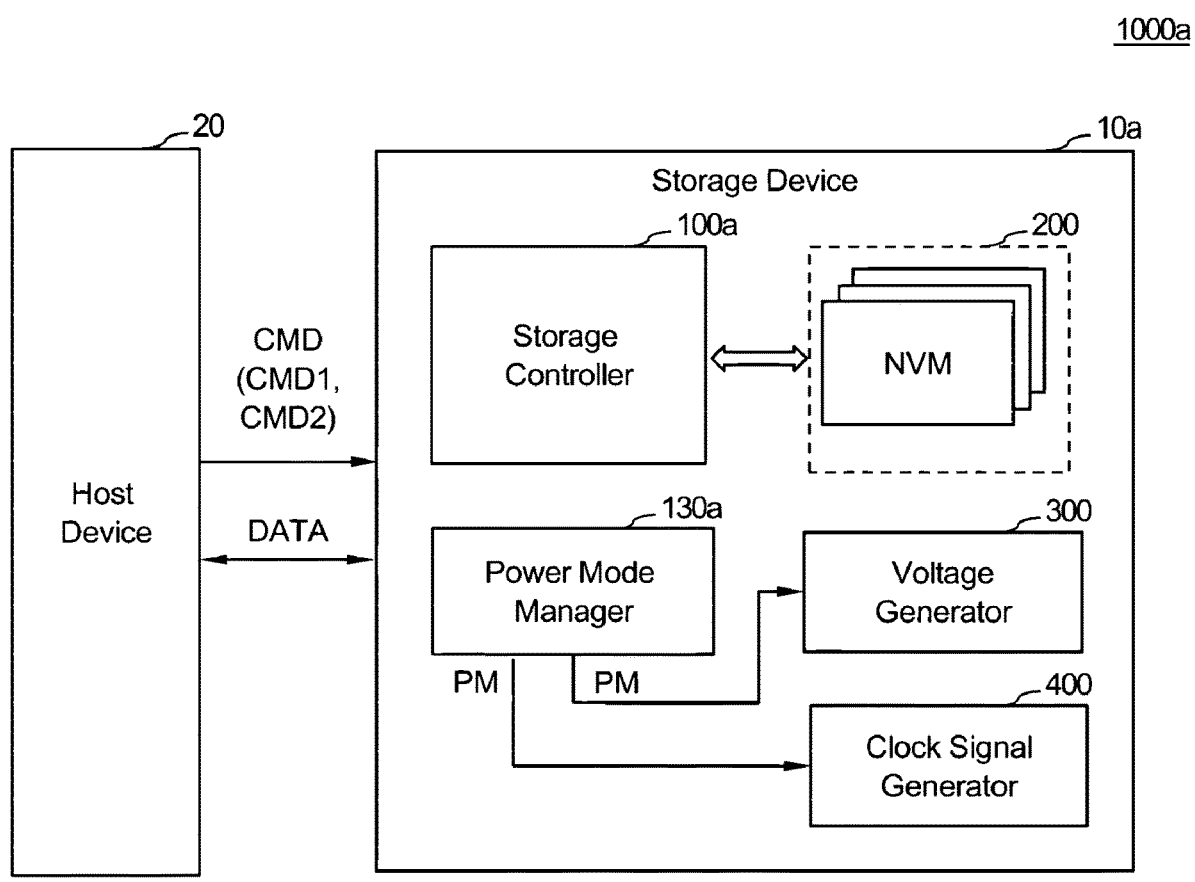
FIG. 12 is a block diagram illustrating a storage device, according to an exemplary embodiment of the present disclosure.

FIG. 12 is a block diagram illustrating a storage system 1000a, according to an exemplary embodiment of the present disclosure.

Referring to FIG. 12, the storage system 1000a may include a storage device 10a and a host device 20. The storage device 10a may include a storage controller 100a, a nonvolatile memory 200, a power mode manager 130a, a voltage generator 300, and a clock signal generator 400. Compared with the storage device 10 of FIG. 1, the power mode manager 130a may be provided as a separate module from the storage controller 100a. The description of the power mode manager 140 described with reference to FIGS. 1 to 11 may be applied to the power mode manager 130a.

When the command CMD is received, the power mode manager 130a may predict the input prediction time at which the next command CMD will be inputted and change the power mode of the storage device 10a based on the predicted input prediction time. The power mode manager 130a may determine whether to change the power mode from the active mode AM to the low power mode LPM, based on the predicted input prediction time, and set a return time to return to the active mode AM from the low power mode LPM. The power mode manager 130a may generate a mode change signal PM and transmit the mode change signal PM to at least one of the voltage generator 300 and the clock signal generator 400 such that the power mode of the storage device 10a may be changed.

For example, when the first command CMD1 is received from the host device 20, the power mode manager 130a may predict an input prediction time at which the second command CMD2 will be inputted to the storage device 10a by using workload information corresponding to the first command CMD1. The power mode manager 130a may set a return time from the input prediction time to return to the active mode AM from the low power mode LPM, and generate a mode change signal PM to return to the active mode AM before the second command CMD2 is received.

While the inventive concept has been particularly shown and described with reference to embodiments thereof, it will be understood that various changes in form and details may be made therein without departing from the spirit and scope of the following claims.

What is claimed is:

1. A storage device operating in a plurality of power modes including an active mode and a low power mode having a lower power consumption than the active mode, the storage device comprising:
  a nonvolatile memory including a plurality of nonvolatile memory cells; and
  a storage controller configured to process commands inputted from a host device in the active mode,
  wherein the storage controller comprises a power mode manager configured to adjust the plurality of power modes,
  wherein the power mode manager is configured to predict an input prediction time for a second command to be inputted from the host device after a first command when the first command is inputted, change from the active mode to the low power mode when a processing operation of the first command is completed, and return to the active mode from the low power mode when a return time elapses according to the input prediction time,
  wherein the power mode manager is configured to compare the input prediction time with a mode switching time taken to return from the low power mode to the active mode, compare electric energy saved by performing the low power mode with the electric energy consumed by changing from the active mode to the low power mode and set the return time based on the input prediction time and the mode switching time, and wherein the power mode manager is further configured to change from the active mode to the low power mode based on comparison results of the compare operations.

2. The storage device of claim 1, wherein the power mode manager is further configured to return from the low power mode to the active mode when the second command is inputted before the return time elapses.

3. The storage device of claim 1, wherein the power mode manager comprises:
a workload monitor configured to output workload information including an idle history including information on idle times, which are intervals between time points at which each of a plurality of commands is inputted;
an idle predictor configured to perform an operation for predicting the input prediction time using the workload information and output prediction result data according to an operation result; and
a return time determiner configured to set the return time using the prediction result data.

4. The storage device of claim 3, wherein the workload information further includes at least one of a size of the first command, a type of the first command, and information on a continuity of a logical block address corresponding to the first command.

5. The storage device of claim 1, wherein the power mode manager sets the return time based on the input prediction time and a time taken to return to the active mode from the low power mode.

6. A method of operating a storage device in a plurality of power modes including an active mode and a low power mode having a lower power consumption than the active mode, the method comprising:
inputting a first command from a host device;
predicting an input prediction time at which a second command is to be inputted from the host device after the first command;
setting a return time to return to the active mode from the low power mode on a timer based on the input prediction time;
switching from the active mode to the low power mode when a processing operation of the first command is completed; and
returning from the low power mode to the active mode when the return time elapses,
wherein the setting of the return time on the timer comprises:
comparing the input prediction time with a mode switching time taken to return from the lower power mode to the active mode;
comparing electric energy saved by performing the low power mode with electric energy consumed by changing from the active mode to the low power mode; and
setting the return time on the timer based on the input prediction time and the mode switching time,
wherein the switching from the active mode to the low power mode comprises switching from the active mode to the low power mode based on comparison results of the comparing operations.

7. The method of claim 6,
wherein the low power mode further comprises an idle mode and a sleep mode having lower power consumption than the idle mode, and wherein the setting of the return time to the timer comprises:
comparing the input prediction time with a sleep mode switching time taken to return from the sleep mode to the active mode;
comparing the input prediction time with an idle mode switching time taken to return from the idle mode to the active mode; and
setting the return time on the timer based on the input prediction time, the sleep mode switching time, and the idle mode switching time.

8. The method of claim 7, wherein the setting of the return time on the timer further comprises, if the input prediction time is greater than the sleep mode switching time, comparing electric energy saved by performing the sleep mode with electric energy consumed by changing power mode.

9. The method of claim 7, wherein the setting of the return time on the timer further comprises, if the input prediction time is less than the sleep mode switching time and greater than the idle mode switching time, comparing electric energy saved by performing the idle mode with electric energy consumed by changing power mode.

10. The method of claim 6, wherein the predicting of the input prediction time comprises predicting the input prediction time using an idle history including information on idle times, which are intervals between time points at which each of a plurality of commands is inputted.

11. The method of claim 10, further comprising:
inputting the second command; and
updating the idle history by storing an idle time between a time point at which the first command is inputted and a time point at which the second command is inputted in the idle history.

12. A storage device operating in a plurality of power modes including an active mode and a low power mode having a lower power consumption than the active mode, the storage device comprising:
a nonvolatile memory including a plurality of nonvolatile memory cells;
a storage controller configured to process commands inputted from a host device in the active mode; and
a power mode manager configured to adjust the plurality of power modes,
wherein the power mode manager is further configured to predict an input prediction time for a second command to be inputted from the host device after a first command when the first command is inputted, change from the active mode to the low power mode when a processing operation of the first command is completed, and return to the active mode from the low power mode when a return time elapses according to the input prediction time,
wherein the power mode manager is configured to compare the input prediction time with a mode switching time taken to return from the low power mode to the active mode, compare electric energy saved by performing the low power mode with the electric energy consumed by changing from the active mode to the low power mode and set the return time based on the input prediction time and the mode switching time, and
wherein the power mode manager is further configured to change from the active mode to the low power mode based on comparison results of the compare operations.

13. The storage device of claim 12, further comprising:
a voltage generator configured to provide an internal voltage to each of the nonvolatile memory and the storage controller, wherein the power mode manager is further configured to transmit a mode change signal to the voltage generator when the return time elapses, and wherein the voltage generator is further configured to change a magnitude of the internal voltage in response to the mode change signal.

14. The storage device of claim 12, further comprising:

a clock signal generator that provides a clock signal to the storage controller, wherein the power mode manager is further configured to transmit a mode change signal to the clock signal generator when the return time elapses, and wherein the clock signal generator is further configured to change a frequency of the clock signal in response to the mode change signal.

15. The storage device of claim 12, wherein the power mode manager is configured to return from the low power mode to the active mode when the second command is inputted before the return time elapses.

16. The storage device of claim 12, wherein the power mode manager comprises:

a workload monitor configured to receive the first command from the storage controller and output workload information including an idle history including information on idle times, which are intervals between time points at which each of a plurality of commands is inputted;

an idle predictor configured to perform an operation for predicting the input prediction time using the workload information and output prediction result data according to an operation result; and a return time determiner configured to set the return time using the prediction result data.

17. The storage device of claim 16, wherein the power mode manager further comprises a processing circuit, and wherein the workload monitor, the idle predictor, and the return time determiner are executed by the processing circuit.

18. The storage device of claim 17, wherein the idle predictor comprises a neural network model, and wherein the neural network model is executed by the processing circuit, such that an operation for predicting the input prediction time is performed.

19. The storage device of claim 16, wherein, when receiving the second command from the storage controller, the workload monitor is further configured to update the idle history by calculating an idle time that is an interval between a time point at which the first command is inputted and a time point at which the second command is inputted.

* * * * *